United States Patent [19]
Klein

[11] Patent Number: 5,056,925
[45] Date of Patent: Oct. 15, 1991

[54] EXTRUDER SCREWS AND METHOD FOR ACCELERATING MELTING IN PLASTICATING EXTRUDERS

[75] Inventor: Imrich Klein, Highland Park, N.J.

[73] Assignee: Scientific Process & Research, Inc., Somerset, N.J.

[21] Appl. No.: 531,760

[22] Filed: Jun. 1, 1990

[51] Int. Cl.⁵ .............................................. B29B 7/42
[52] U.S. Cl. ...................................... 366/90; 366/89; 366/324
[58] Field of Search ...................... 366/79, 80, 81, 82, 366/87, 89, 90; 425/208

[56] References Cited

U.S. PATENT DOCUMENTS

| | | | |
|---|---|---|---|
| 3,941,535 | 3/1976 | Street | 366/90 |
| 4,309,115 | 1/1982 | Klein et al. | 366/89 |

FOREIGN PATENT DOCUMENTS

| | | | |
|---|---|---|---|
| 528792 | 8/1956 | Canada | 366/90 |
| 345228 | 4/1960 | Switzerland | 366/81 |
| 1325458 | 8/1973 | United Kingdom | 366/90 |

Primary Examiner—Philip R. Coe
Assistant Examiner—Reginald L. Alexander
Attorney, Agent, or Firm—Samuelson & Jacob

[57] ABSTRACT

Apparatus and method for use in a plasticating extruder of the type having an axially extending elongate barrel for preparing a plasticated material from solids introduced into the extruder wherein an axially extending screw conveyor continuously conveys material in a downstream direction as the material is melted within a channel in the screw conveyor, the channel extending between a leading face and a trailing face on a flight of the screw conveyor such that a solid bed of material is established and melting takes place to form melted material within a relatively thin melt film established between the solid bed and the barrel, the melted material passing progressively from the melt film into a melt pool formed at the leading face of the flight, and melted material is transferred within a conduit in the screw conveyor from the melt pool to the solid bed, whereby the transferred melted material is forced into intimate contact with unmelted material in the solid bed to heat the unmelted material and accelerate melting.

18 Claims, 6 Drawing Sheets

EXTRUDER SCREWS AND METHOD FOR ACCELERATING MELTING IN PLASTICATING EXTRUDERS

The present invention relates generally to plasticating extruders and pertains, more specifically, to screw conveyors and methods which attain accelerated and improved melting of solids introduced into plasticating extruders employing such screw conveyors.

Generally, in the melting mechanism by which current plasticating extruders process solid material into plasticated material, an extruder screw rotates within an elongate barrel to convey material within a channel in the screw conveyor, downstream between an inlet for the solids and an outlet for the melt. The solids first form a solid bed within the channel and the shearing of the solid material along the wall of the barrel initially forms a relatively thin film of melt between the solid bed and the barrel. Further downstream, the melted material establishes a melt pool along the pushing face of the flight of the screw, that is, at the leading face of the flight which faces downstream, and as the material proceeds downstream, the melt pool grows, until the solid bed is consumed and melting is complete. The melting mechanism is described more fully in U.S. Pat. No. 3,924,842.

Because essentially all of the melting takes place only at the thin melt film, the process usually requires a relatively long extruder in order to complete the melting process. Further, since melting takes place only at the thin melt film, the concentration of energy in that limited volume of material could cause excessively high temperatures in the melted material, requiring the removal of heat by external cooling of the barrel to maintain the temperature of the melt within acceptable limits. Not only is the temperature of the melt very high when the melt from the melt film reaches the melt pool, but exposure of the melt in the melt pool to further shear heating as the melt pool is conveyed downstream tends to increase the temperature of the melt and increase the necessity for external cooling. Elevated melt temperature not only causes degradation of the quality of the extrudate, but also lowers the viscosity of the melt which, in turn, lowers the production rate of the extruder.

It has been recognized that greater melting efficiency might be realized by somehow manipulating either the solids or the melt within the extruder in efforts to expose more solid material to melting temperatures within a shorter span of time, in order to increase melting efficiency and enhance the quality of the extrudate. Thus, extruder screws which accomplish the segregation of already-plasticated material from unplasticated material have been developed for more effective melting with greater efficiency. Further, arrangements have been suggested for breaking up the solid bed with mixing pins and like elements in an effort to accelerate the melting mechanism and attain plasticating with increased efficiency.

The present invention relates to a method for accelerating melting and conserving energy in a plasticating extruder and provides extruder screw conveyors for accomplishing the method, thereby attaining several objects and advantages, some of which are summarized as follows: Attains more effective exposure of the solid material to the heat accumulated in the melted material as the materials are conveyed downstream in a plasticating extruder for more efficient, accelerated melting of the material; utilizes the heat generated by the melting mechanism in a plasticating process more effectively without impairing the melting process; improves the quality of the extrudate and increases the efficiency of the extrusion process by maintaining a lowered temperature and, consequently, an increased viscosity in the melted material for more effective operation of the melting mechanism; improves the quality of the extrudate by decreasing residence time in the extruder and concomitant exposure to high temperature so as to reduce degradation of the extrudate; provides extruder screw conveyors of the type described which are compatible for use in current extrusion apparatus; and readily replaces existing extruder screw conveyors for attaining increased effectiveness at minimal expense.

The above objects and advantages, as well as further objects and advantages, are attained by the present invention, which may be described briefly as apparatus and method for use in a plasticating extruder of the type having an axially extending elongate barrel for preparing a plasticated material from solids introduced into the extruder the apparatus including an axially extending screw conveyor for placement in the barrel, the screw conveyor having at least one flight defining a channel progressing along a helical path axially along the screw conveyor and having a radial depth, the method including continuously conveying the material in a downstream direction as the material is melted within the channel, the flight having a leading face facing downstream and a trailing face facing upstream, the channel extending between the leading face and the trailing face, the leading face and the trailing face including confronting portions located within a melting zone in the screw conveyor, between which confronting portions the solids are compacted in a solid bed of material and melting takes place to form melted material within a melt film established between the solid bed and the barrel, the melted material passing progressively from the melt film into a melt pool formed at the leading face of the flight, within the melting zone of the screw conveyor, the apparatus further including a melt transfer conduit between a first location along the leading face of the flight within the melting zone of the screw conveyor and a second location along the trailing face of the flight, and the method further including effecting transfer of melted material from the melt pool at the first location to the solid bed at the second location, whereby the transferred melted material is forced into intimate contact with unmelted material in the solid bed at the second location to heat the unmelted material and accelerate melting.

The invention will be understood more fully, while still further objects and advantages will become apparent, in the following detailed description of preferred embodiments of the invention illustrated in the accompanying drawing, in which.

Figure 16:
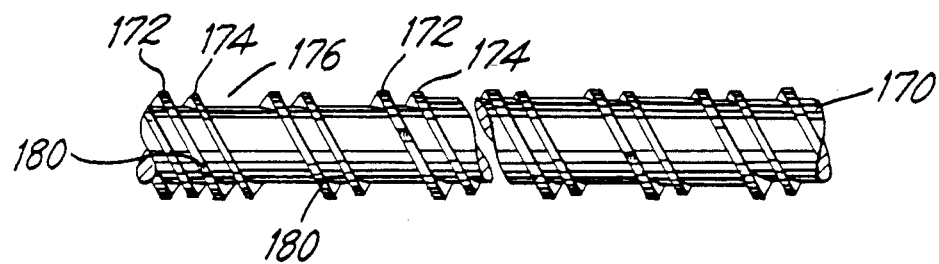
Figure 17:
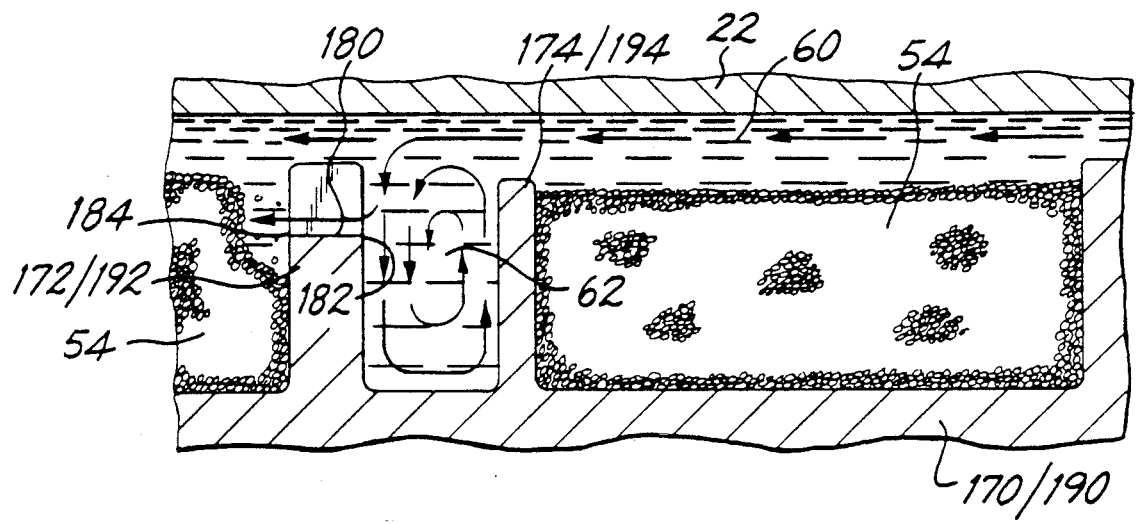

FIG. 16 is an elevational view of a fragment of another screw conveyor constructed in accordance with the invention; and FIG. 17 is a fragmentary cross-sectional view taken across the channel of the screw conveyor of FIG. 16, and an alternate screw conveyor similar to that of FIG. 16, with the screw conveyor placed in an extruder and enlarged to illustrate the construction and operation in greater detail.

Figure 1:
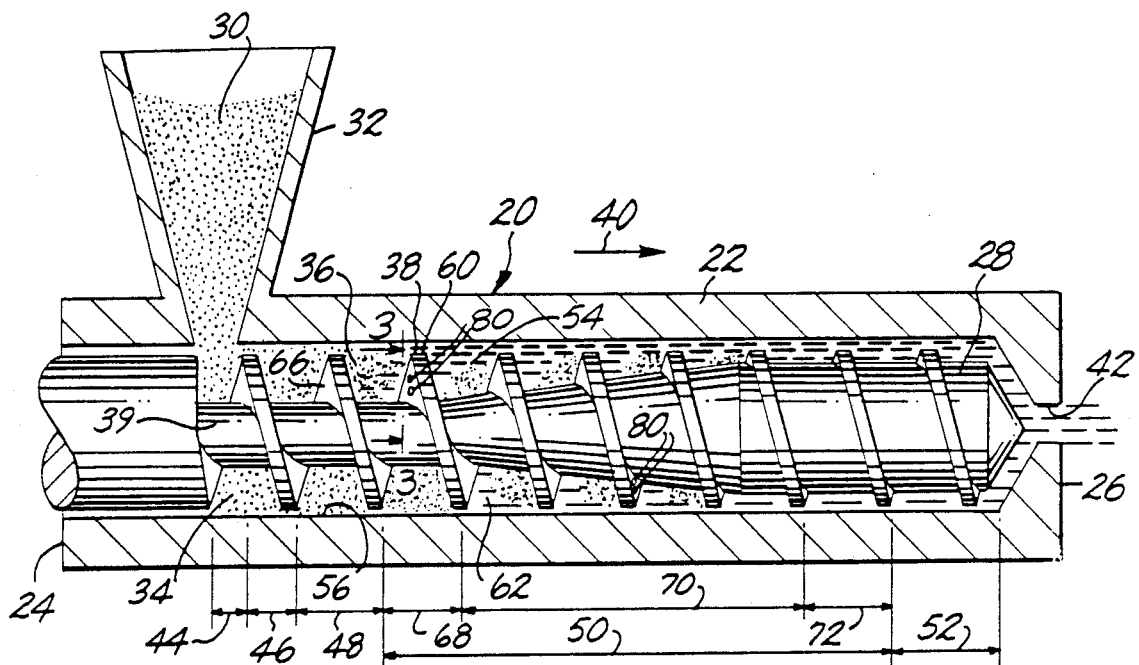
FIG. 1 is a somewhat schematic representation of a plasticating extruder illustrating a screw conveyor constructed and operating in accordance with the present invention.
Figure 2:
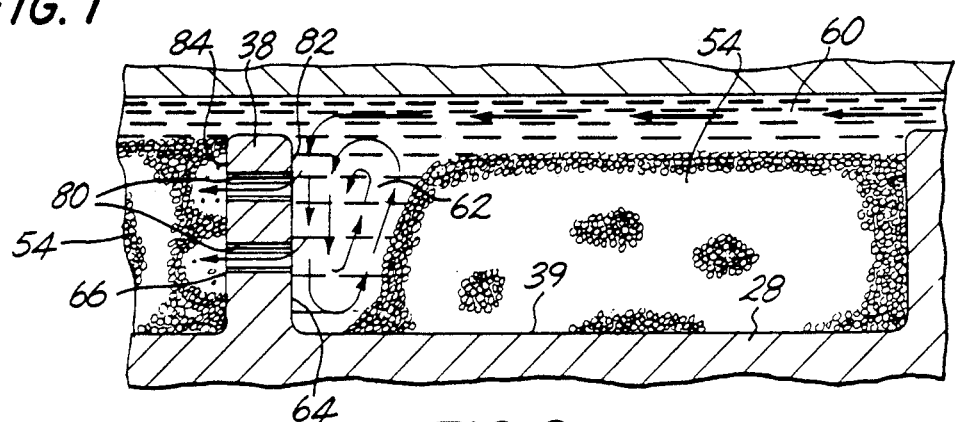
FIG. 2 is a fragmentary cross-sectional view taken across the channel of the screw conveyor of FIG. 1, and enlarged to illustrate the construction and operation in greater detail.
Figure 3:
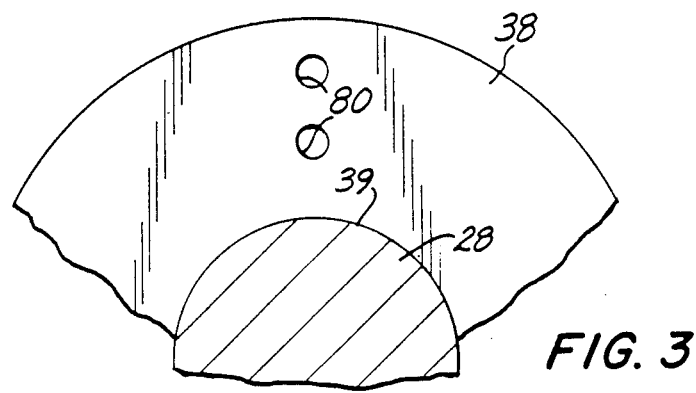
FIG. 3 is an enlarged cross-sectional view taken along line 3—3 of FIG. 1.

Referring now to the drawing, and especially to FIGS. 1 through 3 thereof, a plasticating extruder constructed and operating in accordance with the invention is illustrated somewhat schematically at 20. Extruder 20 includes a barrel 22 extending axially between an upstream end 24 and a downstream end 26, and a screw conveyor 28 in the barrel. A reservoir of solid material 30 is held in a hopper 32 which communicates with the inner chamber 34 of the barrel 22 adjacent the upstream end 24 and feeds the solid material 30 into a channel 36 defined by a helical flight 38 on the screw conveyor 28, the channel 36 following a helical path axially downstream along the screw conveyor 28. Helical flight 38 extends radially from the hub 39 of the screw conveyor 28 to the outer perimeter of the screw conveyor 28. Rotation of the screw conveyor 28 within the barrel 22 will advance the material 30 along the channel 36 in a downstream direction 40 until the material is delivered, in melted form, to a discharge point 42 at the downstream end 26 of the barrel.

Extruder 20 is divided into functional zones; namely, a hopper zone 44, a solids conveying zone 46, a delay zone 48, a melting zone 50, and a melt conveying zone 52. The solids are compacted into a solid bed 54 and, where the inner surface 56 of the barrel 22 reaches the melting point of the material 30, the resulting melt forms a continuous film 60. In the melting zone 50, a melt pool 62 begins to form, cross-channel between the leading face 64 of flight 38, which faces downstream, and the confronting trailing face 66 of flight 38, which faces upstream. The melt pool 62 is juxtaposed with the leading face 64 of flight 38 and gradually replaces the progressively melting solid bed 54 along the melting zone 50. The melt film 60 is fed continuously from the solid bed 54 and, as the volume of the solid bed 54 decreases, and the volume of the melt increases, the melt spills into the low shear melt pool 62, all as explained in the above-cited U.S. Pat. No. 3,924,842.

Melting zone 50 itself usually is divided into three geometrical sections; namely, a relatively deep section 68, of essentially constant radial depth and channel volume, a compression section 70 downstream of the deep section 68 and having a radial depth and channel volume which decrease in the downstream direction, and a relatively shallow section 72 of essentially constant radial depth and channel volume downstream of the compression section 70. As set forth above, because essentially all of the melting takes place only at the thin melt film 60, the process usually requires a relatively long extruder in order to complete the melting process at commercially acceptable rates. Further, since melting takes place only at the thin melt film 60, the concentration of energy in that limited volume of material could cause excessively high temperatures in the melted material, resulting in the lowering of the viscosity of the melt with a concomitant lowering of the melting rate and the production rate of the extruder. Accordingly, removal of heat by external cooling of the barrel 22 usually is required in order to maintain the temperature of the melt within acceptable limits. Not only is the temperature of the melt very high when the melt from the melt film 60 reaches the melt pool 62, but exposure of the melt in the melt pool 62 to further shear heating as the melt pool 62 is conveyed downstream tends to increase the temperature of the melt and increase the necessity for external cooling.

However, in the illustrated arrangement, melting is accelerated by transferring melt from the melt pool 62 into the solid bed 54 so that the transferred molten material will heat the unmelted material in the solid bed 54 for more rapid melting. In order into effect transfer of the molten material directly to the solid bed 54, screw conveyor 28 includes melt transfer means in the form of passages 80 extending through the flight 38 from a first location 82 at the leading face 64 to a second location 84 at the trailing face 66 of the flight 38. Passages 80 serve as conduits through which heated melt from the melt pool 62 is forced by the pressure differential between locations 82 and 84 into intimate contact with unmelted solids in the solid bed 54 to heat the unmelted material and accelerate melting. The first and second locations 82 and 84 are juxtaposed essentially back-to-back so that passages 80 provide essentially direct paths from the melt pool 62 into the solid bed 54. Passages 80 are spaced radially inwardly from the perimeter of the flight 38 and radially outwardly from the root of the flight 38 at hub 39, and are spaced from one another so as not to disturb significantly the downstream conveying function of the material being plasticated and to maintain sufficient structural strength in the flight 38. First locations 82 are spaced from one another along the helical path of the channel 36 a distance great enough to enable the re-establishment and formation of a subsequent melt pool 62 at each subsequent first location 82 downstream of each previous first location 82 and the corresponding previous melt pool 62 from which melted material was transferred to a corresponding previous second location 84. Thus, rather than effecting removal of the heat from the melt film 60 through the barrel 22 to limit the temperature of the melt, the present arrangement transfers heat from the melt to unmelted material in the solid bed 54 by effecting a more intimate contact between the melt and the unmelted material in the solid bed 54, thereby conserving energy while assuring that the temperature of the melt does not exceed desired limits. At the same time, the temperature of the melted material in the melt film is lowered and the viscosity is increased concomitantly so that the material is melted more effectively and the length of the melting zone 50 is decreased. Consequently, the length of the extruder itself may be reduced, enabling a reduction in the residence time of the material in the extruder and the period of exposure to higher temperatures and high shear. Additionally, the production rate of the extruder 20 can be increased by increasing the speed of rotation of the screw conveyor or by altering the screw conveyor geometry, without necessarily increasing the temperature of the melt or lowering the quality of the extrudate. Alternately, the speed of rotation of the screw conveyor can be lowered while still maintaining the desired production rate.

Figure 4:
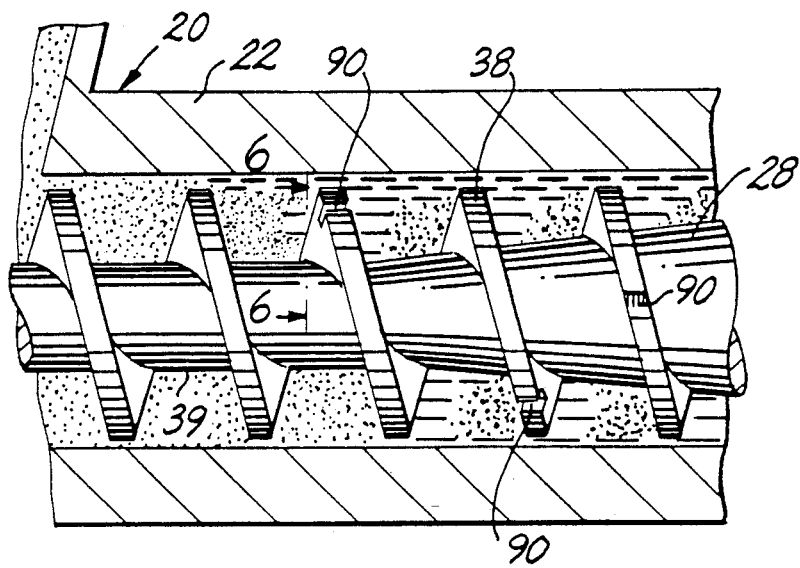
FIG. 4 is a fragmentary, somewhat schematic representation of a portion of another plasticating extruder similar to that of FIG. 1, but illustrating an alternate construction of the screw conveyor of the extruder.
Figure 5:
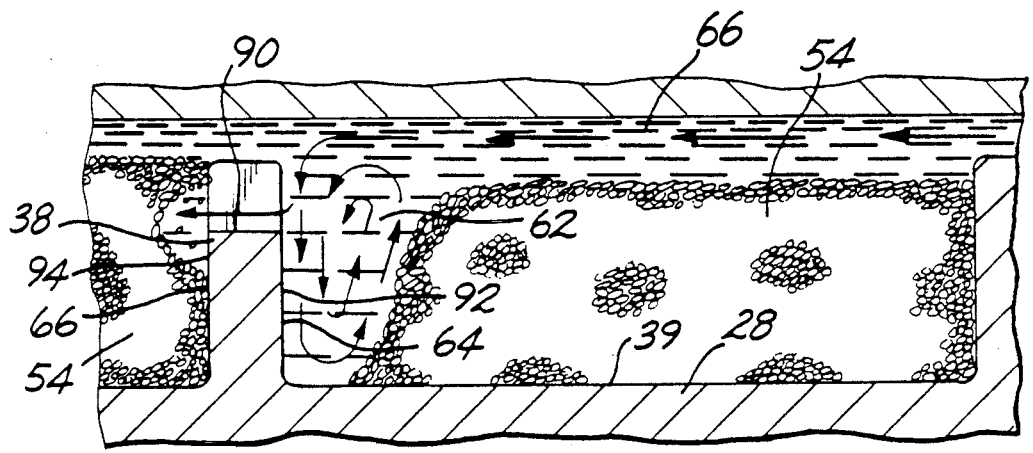
FIG. 5 is a fragmentary cross-sectional view taken across the channel of the screw conveyor of FIG. 4, and enlarged to illustrate the construction and operation in greater detail.
Figure 6:
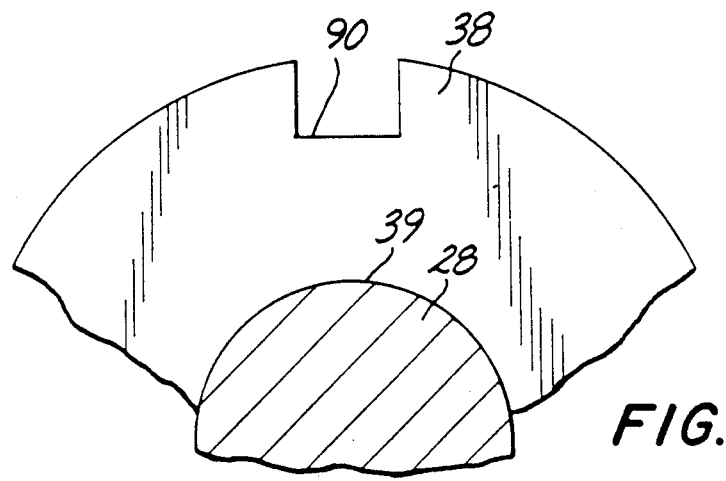
FIG. 6 is an enlarged cross-sectional view taken along line 6—6 of FIG. 4.
Figure 7:
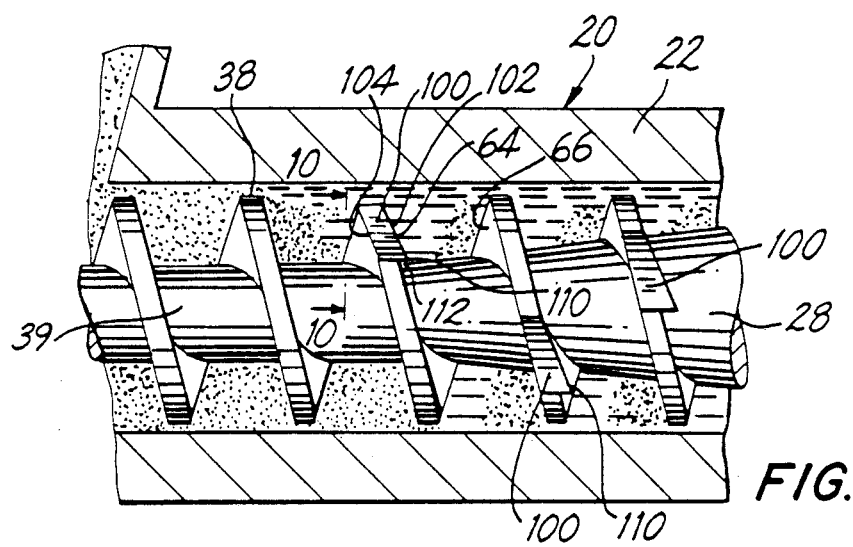
FIG. 7 is a fragmentary, somewhat schematic representation of another plasticating extruder illustrating another alternate screw conveyor constructed and operating in accordance with the present invention.
Figure 8:
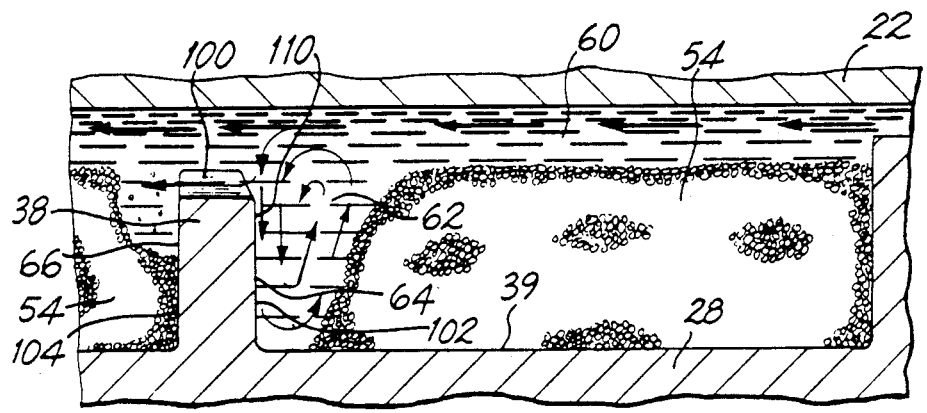
FIG. 8 is a fragmentary cross-sectional view taken across the channel of the screw conveyor of FIG. 7, and enlarged to illustrate the construction and operation in greater detail.
Figure 9:
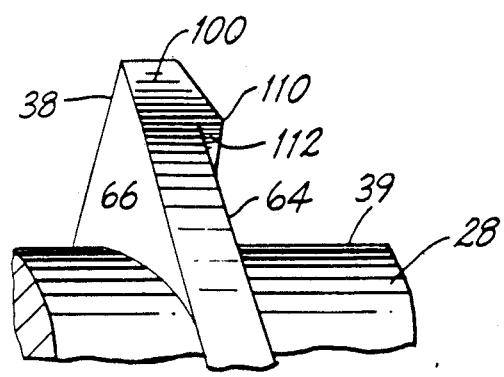
FIG. 9 is a fragmentary view of a portion of FIG. 7, enlarged to illustrate the construction in greater detail.
Figure 10:
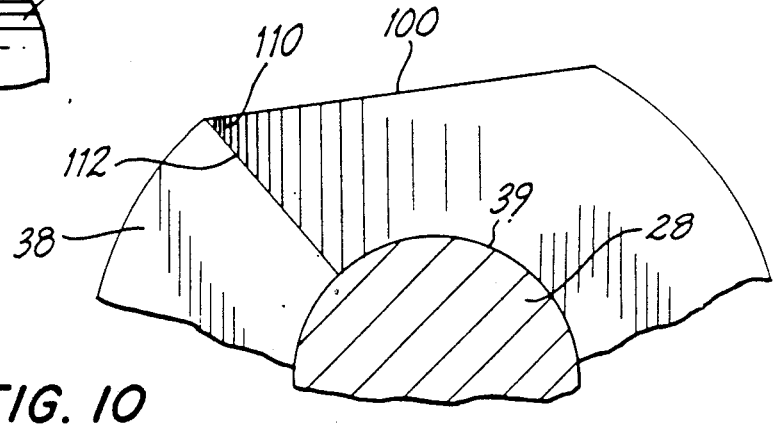
FIG. 10 is an enlarged fragmentary cross-sectional view taken along line 10—10 of FIG. 7.

In the embodiment of FIGS. 4 through 6, the melt transfer means is in the form of notches 90 which extend radially inwardly from the outer perimeter of the flight 38 and provide conduits between first locations 92 at the leading face 64 to second locations 94 at the trailing face 66 of the flight 38. The notches 90 enable transfer of the melt from melt pool 62 into solid bed 54 in much the same manner as do the passages 80 in the embodiment of FIGS. 1 and 2, except that transfer of the melt through the notches 90 is assisted by drag flow caused by the portions of the barrel 22 juxtaposed with the notches 90. Further, notches 90 have the advantage of added simplicity of construction and manufacture.

Turning now to the alternate arrangement illustrated in FIGS. 7 through 10, the melt transfer means includes a reduction in the radius of the outer perimeter of the flight 38, at positions spaced along the perimeter of the flight 38, to establish conduits for the melt at those positions, as illustrated at perimetric undercut portions 100 of the flight 38, placed at locations 102 and 104 on the flight 38, in place of the passages 80 and the notches 90 described above in connection with the embodiments of FIGS. 1 through 4. As a further alternate, supplemental urging means in the form of axially enlarged portions 110 in the flight 38 at the perimetric undercut portions 100 extend from the leading face 64 of the flight 38 in a downstream direction and decrease the axial distance between the confronting portions of the leading face 64 and the trailing face 66 of the flight 38 and the volume of the channel 36 in the vicinity of the enlarged portions 110 to assist in forcing the melt out of the melt pool 62 at location 102 and into the solid bed 54 at location 104. The relatively sudden return of the flight 38 to the lessened axial dimension, and the concomitant increased axial distance between the confronting portions of the leading face 64 and the trailing face 66 of the flight 38, at return portion 112 thereof, assures that the melt pool 62 will be re-established quickly and the melting process will continue.

Figure 11:
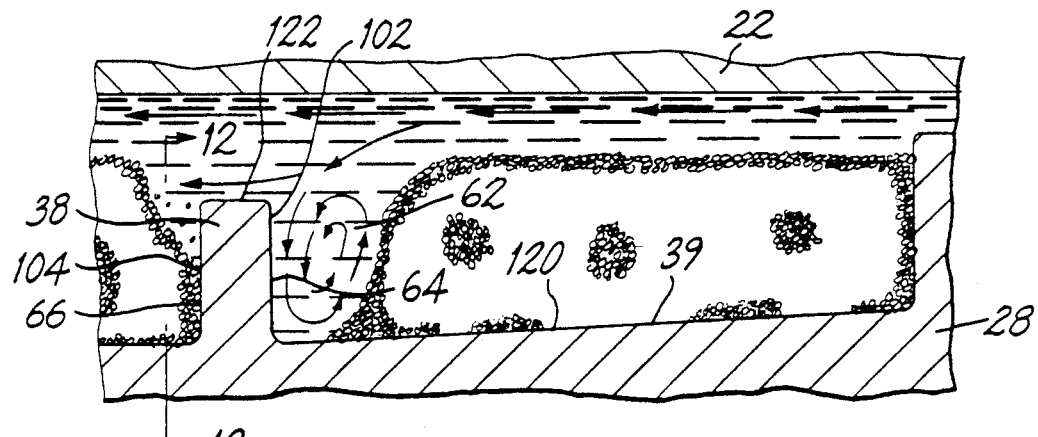
FIG. 11 is a fragmentary cross-sectional view similar to the view in FIG. 8, but showing an alternate construction.
Figure 12:
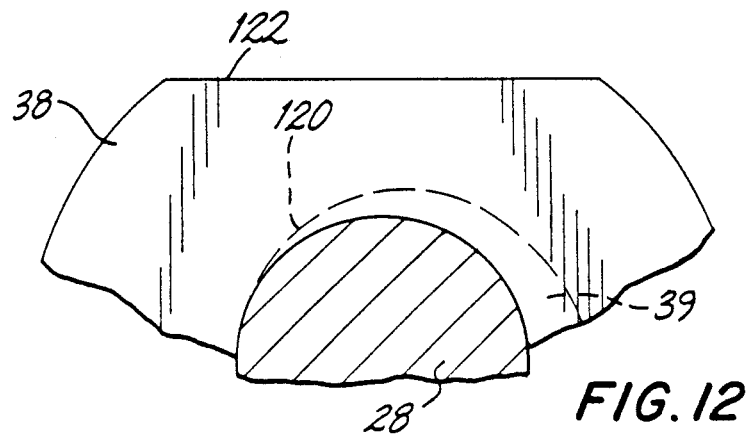
FIG. 12 is a fragmentary cross-sectional view taken along line 12—12 of FIG. 11.

In the embodiment of FIGS. 11 and 12, the supplemental urging means is in the form of radially enlarged portions 120 of the hub 39 of the screw conveyor 28 located adjacent the perimetric undercut portions 122 of the flight 38 so as to effect a reduction in the volume of the channel 36 in the vicinity of the perimetric undercut portions 122 and assist in forcing melt from the melt pool 62 at location 102 into the solid bed 54 at location 104.

Figure 13:
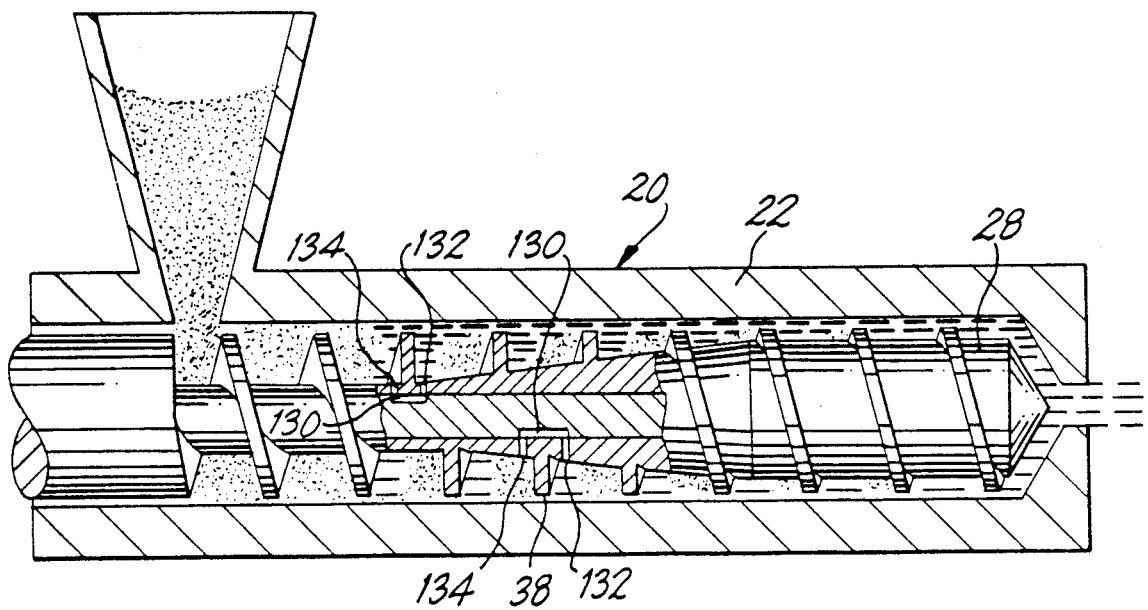
FIG. 13 is a schematic representation of still another plasticating extruder similar to that of FIG. 1, but illustrating another alternate construction of the screw conveyor of the extruder.
Figure 14:
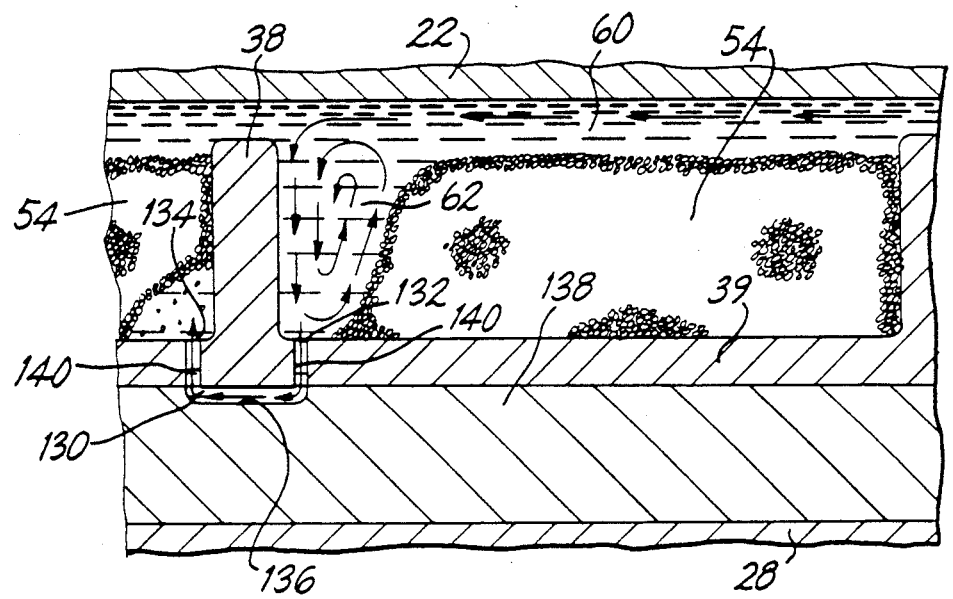
FIG. 14 is a fragmentary cross-sectional view taken across the channel of the screw conveyor of FIG. 13, and enlarged to illustrate the construction and operation in greater detail.

Referring now to FIGS. 13 and 14, in an alternate arrangement, the melt transfer means is in the form of passages 130 in the hub 39 of the screw conveyor 28, each passage 130 extending into the hub 39 and beneath the flight 38 between a first location 132 at the leading face of the flight 38 and a second location 134 at the trailing face of the flight 38, the corresponding first and second locations 132 and 134 being located axially back-to-back so that each passage 130 interconnects the first and second locations 132 and 134 through a relatively short, generally axial path. Each passage 130 thus serves as a conduit for transferring melt from the melt pool at the first location 132 into the solid bed at the corresponding second location 134. Preferably, the passages 130 are constructed by forming axially extending grooves 136 in a core 138 fitted into the hub 39 of the screw conveyor 28 so that each groove 136 communicates with counterpart radial holes 140 in the hub 39, the radial holes communicating with the corresponding first and second locations 132 and 134.

Figure 15:
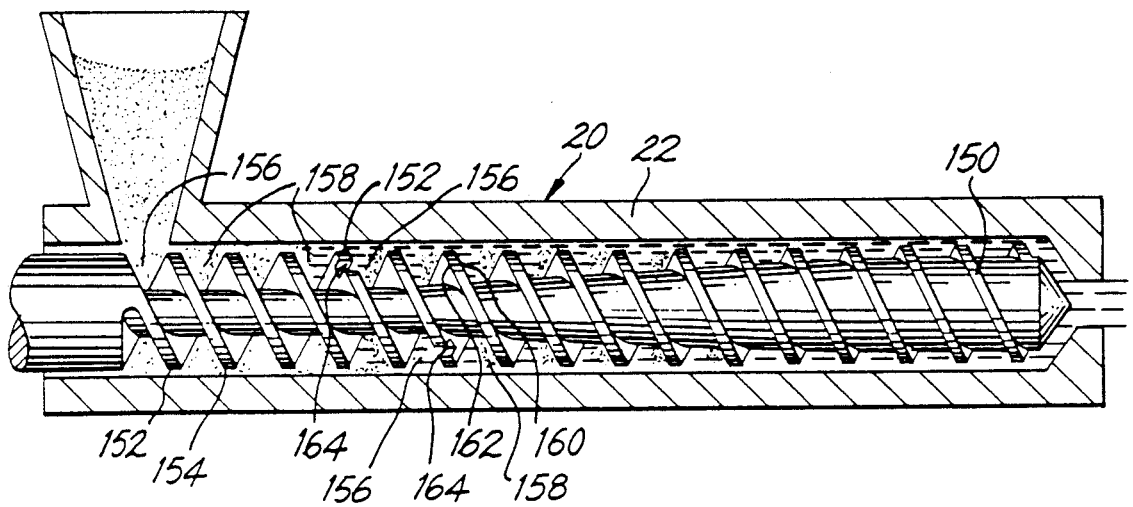
FIG. 15 is a schematic representation of yet another plasticating extruder, illustrating another alternate construction of the screw conveyor of the extruder.

Turning now to FIG. 15, another embodiment of the invention employs a double-flighted screw conveyor 150 within the barrel 22 of the extruder 20. In the illustrated embodiment, two flights 152 and 154, respectively, extend helically along the screw conveyor 150 to define first and second channels 156 and 158. Each flight 152 and 154 has a leading face 160 and a trailing face 162. The melt transfer means is in the form of notches 164 which extend radially inwardly from the outer perimeter of each flight 152 and 154 and provide conduits between first locations 164 at the leading face 160 to second locations 166 at the trailing face 162 of each flight 152 and 154. The notches 164 enable transfer of the melt from melt pool 62 into solid bed 54 in much the same manner as do the notches 90 in the embodiment of FIGS. 4 through 6, and have the advantage of the same simplicity of construction and manufacture; however, in the present embodiment, the melt transferred through the notches 164 passes between the first channel 156 and the second channel 158.

Yet another embodiment of the invention is illustrated in FIGS. 16 and 17 wherein a screw conveyor 170 includes a main flight 172 and a barrier flight 174. The main flight 172 defines a channel 176 and that channel 176 is divided by the barrier flight 174 in a manner now well known in barrier flighted screw conveyors. The melt transfer means is in the form of notches 180 which extend radially inwardly from the outer perimeter of the main flight 172 and provide conduits between first locations 182 at the leading face of the main flight 172 to second locations 184 at the trailing face of the main flight 172. Corresponding first and second locations 182 and 184 are located axially back-to-back on the main flight 172 so that the notches 180 enable transfer of the melt from melt pool 62 into solid bed 54 in much the same manner as do the notches 90 in the embodiment of FIGS. 4 through 6, and have the same advantage of simplicity of construction and manufacture. A decrease in the axial spacing between the barrier flight 174 and the main flight 172 in the vicinity of each notch 180 serves as a supplemental urging means for urging the melt from the melt pool 62 through the corresponding notch 180 into the solid bed 54. In addition, the barrier flight 174 assists in re-establishing the melt pool 62 after the melting mechanism is disturbed by urging melt from the melt pool 62 into the solid bed 54. Where the screw conveyor is provided with more than one main flight, as illustrated in FIG. 17 wherein an alternate screw conveyor 190 is provided with a second main flight 192, a corresponding barrier flight 194 is associated with the second main flight 192 for operation in essentially the same manner as the operation of the first main flight 172 and associated barrier flight 174.

It will be apparent that the present invention exhibits the several objects and advantages summarized above, namely: Attains more effective exposure of the solid material to the heat accumulated in the melted material as the materials are conveyed downstream in a plasticating extruder for more efficient, accelerated melting of the material; utilizes the heat generated by the melting mechanism in a plasticating process more effectively without impairing the melting process; improves the quality of the extrudate and increases the efficiency of the extrusion process by maintaining a lowered temperature and, consequently, an increased viscosity in the melted material for more effective operation of the melting mechanism; improves the quality of the extrudate by decreasing residence time in the extruder and concomitant exposure to high temperature so as to reduce degradation of the extrudate; provides extruder screw conveyors of the type described which are compatible for use in current extrusion apparatus; and readily replaces existing extruder screw conveyors for attaining increased effectiveness at minimal expense.

It is to be understood that the above detailed description of preferred embodiments of the invention are provided by way of example only. Various details of design, construction, operation and procedure may be modified without departing from the true spirit and scope of the invention, as set forth in the appended claims.

The embodiments of the invention in which an exclusive property or privilege is claimed are defined as follows:

1. Apparatus for use in a plasticating extruder of the type having an axially extending elongate barrel for preparing a plasticated material from solids introduced into the extruder, the apparatus comprising:

an axially extending screw conveyor for placement in the barrel, the screw conveyor having at least one flight defining a channel progressing along a helical path axially along the screw conveyor and having a radial depth for continuously conveying the material in a downstream direction as the material is melted within the channel, the flight having a leading face facing downstream and a trailing face facing upstream, the channel extending between the leading face and the trailing face, the leading face and the trailing face including confronting portions located within a melting zone in a screw conveyor, between which confronting portions the solids are compacted in a solid bed of material and melting takes place to form melted material within a melt film established between the solid bed and the barrel, the melted material passing progressively from the melt film into a melt pool formed at the leading face of the flight, within the melting zone of the screw conveyor; and melt transfer means between a first location along the leading face of the flight within the melting zone of the screw conveyor and a second location along the trailing face of the flight for effecting transfer of melted material from the melt pool at the first location into the solid bed at the second location, whereby the transferred melted material is forced into intimate contact with unmelted material in the solid bed at the second location to heat the unmelted material and accelerate melting.

2. The invention of claim 1 wherein the first and second locations are placed essentially back-to-back on the flight of the screw conveyor and the melt transfer means includes melt conduit means in the screw conveyor and extending through the screw conveyor from the first location to the second location.

3. The invention of claim 2 wherein the flight of the screw conveyor includes a radially outer perimeter and the melt conduit means includes at least one passage spaced radially inwardly from the outer perimeter and passing through the screw conveyor from the first location to the second location.

4. The invention of claim 3 wherein the passage extends through the flight.

5. The invention of claim 3 wherein the passage extends beneath the flight.

6. The invention of claim 2 wherein the flight of the screw conveyor includes a radially outer perimeter and the melt conduit means includes at least one undercut extending radially into the flight from the outer perimeter radially into the flight between the first and second locations.

7. The invention of claim 6 wherein the undercut is a notch.

8. The invention of claim 2 wherein the melt transfer means includes supplemental urging means located between the confronting portions of the leading and trailing faces of the flight for urging the transfer of the melted material from the first location to the second location.

9. The invention of claim 8 wherein the supplemental urging means includes volume reduction means effecting a reduction in the volume of the channel in the vicinity of the first location so as to tend to force the transfer of the melted material toward the second location.

10. The invention of claim 9 wherein the volume reduction means includes a reduction in the axial distance between the confronting portions of the leading face and the trailing face.

11. The invention of claim 9 wherein the volume reduction means includes a reduction in the radial depth of the channel between the confronting portions of the leading face and the trailing face.

12. The invention of claim 1 including a plurality of first locations and corresponding second locations, the first locations being spaced from one another along a helical path a distance great enough to enable the formation of a subsequent melt pool at each subsequent first location, downstream of each previous first location, and the corresponding previous melt pool from which melt was transferred to a corresponding previous second location.

13. The invention of claim 12 including a barrier flight associated with said one flight for assisting the formation of each subsequent melt pool.

14. The invention of claim 1 wherein the screw conveyor has more than one flight, with each flight defining a channel progressing along a helical path axially along the screw conveyor such that the channels are adjacent one another, and the melt transfer means is arranged so that each first location in one channel has a corresponding second location in an adjacent channel.

15. The invention of claim 14 including a barrier flight associated with each said more than one flight for assisting the formation of each subsequent melt pool.

16. The method for preparing a plasticated material from solids introduced into a plasticating extruder of the type having an axially extending elongate barrel and an axially extending screw conveyor for placement in the barrel, the screw conveyor having at least one flight defining a channel progessing axially along the screw conveyor and having a radial depth, the flight having a leading face facing downstream and a trailing face facing upstream, the channel extending between the leading face and the trailing face, the leading face and the trailing face including confronting portions located within a melting zone in the screw conveyor, the method comprising:

continuously conveying the material in a downstream direction to effect melting of the material within the channel, the melting taking place between the confronting portions of the flight such that the solids are compacted in a solid bed of material and melting takes place to form melted material within a melt film established between the solid bed and the barrel, the melted material passing progressively from the melt film into a melt pool formed at the leading face of the flight, within the melting zone of the screw conveyor; and transferring melted material from the melt pool at a first location along the leading face of the flight within the melting zone of the screw conveyor into the solid bed at a second location along the trailing face of the flight, whereby the transferred melted material is forced into intimate contact with unmelted material in the solid bed at the second location to heat the unmelted material and accelerate melting.

17. The invention of claim 16 wherein the first and second locations are placed back-to-back on the flight of the screw conveyor and the melted material is transferred upstream from the first location to the second location.

18. The invention of claim 17 including supplementally urging the transfer of the melted material from the first location to the second location.

* * * * *